United States Patent [19]

Drouzy et al.

[11] 4,174,972
[45] Nov. 20, 1979

[54] NONFIBROUS CASTABLE REFRACTORY CONCRETE HAVING HIGH DEFLECTION TEMPERATURE AND HIGH COMPRESSIVE STRENGTH AND PROCESS

[76] Inventors: Michel L. Drouzy, 49 Blvd. Saint-Germain, 75005, Paris; Michel M. Richard, 4 rue Faraday, 75017, Paris; François P. Huet, 10 rue de Marignan, 75008, Paris; Henri M. Lacau, 29 rue de l'Universite, 75007, Paris, all of France

[21] Appl. No.: 898,194

[22] Filed: Apr. 20, 1978

Related U.S. Application Data

[63] Continuation-in-part of Ser. No. 689,374, May 24, 1976, abandoned.

[30] Foreign Application Priority Data

May 29, 1975 [FR] France ............................... 75 16810

[51] Int. Cl.$^2$ ............................................. C04B 35/02
[52] U.S. Cl. ...................................... 106/64; 106/104
[58] Field of Search ................... 106/64, 65, 73.1, 104

[56] References Cited

U.S. PATENT DOCUMENTS 3,617,319  11/1971  Sadran et al. ........................ 106/104

Primary Examiner—James Poer
Attorney, Agent, or Firm—Frishauf, Holtz, Goodman & Woodward

[57] ABSTRACT

A nonfibrous castable refractory concrete, having a deflection temperature under load above 1000° C. and a compressive strength higher than 1450 Newton/cm$^2$, comprising grains bound by a hydraulic binder and having a content by weight of aluminum expressed as $Al_2O_3$ of from 40 to 60%, a content by weight of calcium expressed as CaO of from 4 to 14%, a content by weight of silicon expressed as $SiO_2$ of from 20 to 60% and a content by weight of fluorine of from 0.1 to 10%, a part of said fluorine being present as alkali or alkaline earth metal fluoride. The invention also provides a process for making said concrete.

1 Claim, No Drawings

NONFIBROUS CASTABLE REFRACTORY CONCRETE HAVING HIGH DEFLECTION TEMPERATURE AND HIGH COMPRESSIVE STRENGTH AND PROCESS

This application is a continuation-in-part application of Ser. No. 689,374 filed May 24, 1976, now abandoned.

This invention relates to refractory materials and, more especially, to refractory materials intended to withstand contact with molten metallic masses of aluminium and its alloys, both for use in the construction of smelting furnaces and for the manufacture of fittings for furnaces of this kind, such as ducts, chutes, transfer ladles or casting ladles, which remain in contact with molten aluminium, often for prolonged periods.

Refractory compositions of the type used in the smelting of metals contain silica, generally in the form of various silicates. The proportion of silica varies according to the type of composition. It amounts to approximately 60% by weight in so-called argillaceous or silico-aluminous products (35% of alumina) and to 35% in aluminous products (60% of alumina) based on sillimanite, bauxite, mullite or others. The "alumina" itself contains of the order of 1% of silica. The magnesia or chrome-magnesia products often contain close to 10% of silica.

This silica tends to react with the reducing metals, such as aluminium, in accordance with the following scheme:

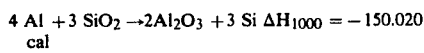

$$4\,Al + 3\,SiO_2 \rightarrow 2\,Al_2O_3 + 3\,Si \quad \Delta H_{1000} = -150.020\ cal$$

This reduction of the silica or silicates by the reducing metal liberates a considerable amount of energy. Theoretically, it could be continued until one of the two starting products has been completely consumed. In practice, the reaction velocity is slow enough for lightweight reducing metals and their alloys to be melted in furnaces made of materials containing silica. However, various phenomena are encountered, as a result of which the furnaces or their fittings soon have to be taken out of service. The refractory material gradually becomes impregnated. As a result, it changes into a black, extremely hard mass which is an aggregate of corundum and aluminium. This mass conducts both heat and electricity which can have serious consequences for an electric furnace and gives rise to significant losses of energy. Swelling and cracking occurs, above all when the alumina content of the refractory composition is low. Particles of refractory material become detached from the furnace and reappear in the aluminium articles in the form of hard inclusions. "Mushrooms" of oxides are formed both on the hearth and above all on the walls of the furnace in contact with the bath. These mushrooms grow until they obstruct a large part of the furnace. They are extremely hard and, in practice, cannot be detached from the walls.

British Patent Specification No. 1,135,147 and the article by W. Helling and E. Kistermann entitled "Salzimpragnierverfahren fur Zustellung von Aluminium-Schmelz und Warmhalteofen" published in the Journal "Aluminium" 33 (1957) No. 8, pages 514 to 520, recall these serious difficulties of the aluminium industry and suggest overcoming them by coating the inner walls of the furnace with a mixture of 80% of sodium chloride and 20% of cryolite. The melting point of this mixture is 795° C. Because it is very fluid, it penetrates readily into the surface pores of the chamotte-based refractory material. Generally, it has a visible thickness of 1 to 2 mm, although the depth of penetration into the refractory material reaches 6 mm. The high sodium content of this so-called glazing flux and its resulting relatively low melting point make it substantially non-refractory and relatively weak. In time the impregnation has to be repeated, which the authors have recognised. A technical leaflet for commercial consumption issued by Societe Servimetal ancien department, fonderie soudure Otalu, 87 Rue Pierre Joigneaux, 92 BoisColombes, France, entitled "Les Procédés de glacage des garnissages refractaires des fours de fusion et de coulee utilises dans les fonderies d'aluminium" [Methods of Glazing the Refractory Linings of Smelting furnaces and Casting Furnaces used in Aluminium Foundries], is more explicit. After having recalled the detrimental effect of molten aluminium on the furnace, it proposes two glazing techniques using a mixture of 80% of NaCl and 20% of $AlF_3 - 3\,NaF$. The deep impregnation technique, corresponding to that described in the abovementioned German Article, has given way to a so-called "surface impregnation" method which is more advantageous because it is simpler and quicker, using less glazing flux and requiring lower working temperatures. After the furnace has been dried and fired, this improved method comprises regulating the surface temperature of the refractory lining to between 750 and 780° C., spraying the hearth with a quantity of flux amounting to between 7 and 10 kg per $cm^2$ using a compressed-air projection apparatus, charging aluminium, preferably ordinary aluminium, approximately 1 hour after the beginning of melting, the charge being calculated in such a way that it represents only one third of the normal capacity of the furnace, distributing from 2 to 3 kg of flux per square meter of hearth over the bath when the charge is half melted, distributing another flux over the dross at the end of melting, the temperature of the bath being of the order of 730 to 750° C., this other flux making the dross dry and powdery and hence easy to remove by drossing after 4 to 5 minutes' reaction, degassing and puddling in the usual way, completely emptying the furnace and carefully scraping the hearth, applying another glaze in the same way as described above, except that the second charge of metal is calculated to amount to half the normal capacity of the furnace, followed by a third glaze applied in the same way as described above except for a few modifications, and renewing the glaze five days later. Since the furnace is thus prepared once and for all, it is sufficient to apply an interim glaze once a month. The complexity and labour costs, the general immobilisation and materials involved in these initial and subsequent glazings have prevented the development of these techniques, especially since the addition of relatively volatile flux continuously contaminates the aluminium treated. In fact aluminium founders continue to work in the same way as before and include in their manufacturing costs the investment required for the frequent replacement of the furnaces, their rapid reduction in capacity, their immobilisation for cleaning purposes after each batch and the costs attributable to losses of aluminium, still with the fear that a "hard spot" in the molten aluminium will not damage an expensive tool downstream of the furnace. These techniques have failed because they have been unable to escape from the following dilemma. If a low melting point flux is used for impregnation, impregnation can readily be carried out, but unfortunately the flux evaporates rapidly. If a refractory flux is used for impregnation, the furnace has to be heated to a high temperature in order both to make the flux fluid and to enable it to be effectively applied. Unfortunately, the furnace is incapable or substantially incapable of withstanding this temperature and is permanently damaged.

In the article by Michel Drouzy and Michel Richard entitled "oxydation des alliages fondus, reaction avec les refractaires" [Oxidation of Molten Alloys, Reaction with Refractory Materials], published in the Journal Fonderie 332, pages 121 to 128 in March 1974, it was recalled that J. W. Fruehling and J. D. Hanawalt demonstrated that a fluorine-containing atmosphere protected a furnace of refractory material intended for the treatment of liquid magnesium (Atmosphere protectrice pour la fusion des alliages du magnesium [Protective Atmosphere for Melting Magnesium Alloys,], Modern Casting 56, August 1969, pages 159 to 164), and it was found that this fluorine-containing atmosphere was also suitable for protecting a refractory material of an aluminium bath.

The protection obtained is temporary (a few days at the most) and is governed by the quantity of fluorine which the refractory composition is able to adsorb in its pores once the fluorine-containing compound placed in the furnace has been consumed. In the case of a furnace or ladle which does not work in a confined atmosphere, the permanent renewal of the atmosphere virtually prevents correct protection from being obtained. In addition, the removal of large quantities of fluorine-containing gases is too dangerous for adoption on a wide scale in foundry work.

It had not been considered to overcome these difficulties by incorporating fluorine-containing compounds in the actual mass of the refractory composition because it was known that the fluorine-containing compounds are fluxes which adversely affect the refractory qualities of the products to which they are added. However, the addition of fluorine derivatives to construction materials which are not intended to come into contact with molten aluminium has already been carried out to the detriment of their refractory qualities essentially under two types of specific conditions. On the one hand, it has been proposed to mix a little fluoride with refractory compositions bonded by a phosphate (cf. inter alia the Article by Herbert D. Sheets, Jack J. Bulloff and Wiston H. Duckworth of the Batelle Memorial Institute entitled "Phosphate Bonding of Refractory Compositions" published in Brick and Clay Record in July, 1958, or the Article published in Berichte der Deutschen Keramischen Gesellschaft, Vol. 37 (1960), No. 8, pages 362 to 367 by H. Betchel and G. Ploss entitled "Uber das Abbinden von Keramischer Rohstoffen mit monoaluminiumphosphate Losung (Feuerfestbinder 32)". Thus, an attempt was made to improve the setting of concrete by the addition of fluoride. It was hoped that the formation of fluophosphates would promote this effect. In order to offset the adverse effect upon refractory properties, use was made according to the first Article of expensive refractory constituents such as tabular alumina, zirconia, etc. whereas according to the second Article there is a warning that, in practice, it is generally not possible to obtain a high pyroscopic resistance if the presence of fluorine can be tolerated with a view to forming a vitreous fluophosphate phase to accelerate setting. On the other hand, attempts have been made to produce vitreous sodium-containing products referred to as refractory concretes in the book entitled "Hitzebestandiger Beton" by Nekrassow (Bauverlag GMBH Wiesbaden-Berlin 1961), especially in the third and fourth chapters, by the use of soluble glass and sodium fluosilicate. The high sodium contents of these glasses adversely affect their refractory quality. A chamotte fire resistant up to 1580° C. withstands a temperature of only 900° C. when a soluble glass and fluosilicate, both powerful fluxes, are added to it. In order to withstand a temperature of 1000° C., a chromite has to be used (cf. the Table on page 239). None of these publications refers to the particular case of a furnace for molten aluminium.

U.S. Pat. No. 3,261,699 describes bricks intended for furnaces for the electrolysis of aluminium.

The inventive idea of this patent is to make the furnace of the same constituents as the electrolysis bath, namely cryolite and $Al_2O_3$. As a result, the bath is never polluted, even if the furnace is as it were attacked during electrolysis. To obtain this result, it is specifically pointed out in column 5, lines 30 to 32 of the abovementioned Patent Specification that, if additives are used, they must be used in relatively small quantities, i.e. in quantities of less than 1%. This is so true that the Patentee recommends using synthetic alumina, namely alumina produced by the Bayer process, whilst the cryolite is also artificial cryolite. Accordingly, the product in question is a very expensive product of synthetic origin.

On the other hand, it has been found in accordance with the present invention that it is possible to use a refractory material which is relatively inexpensive because it is produced from natural materials and which is sufficiently resistant to molten aluminium even when it contains an appreciable quantity of silica.

By virtue of the present invention, it is possible to produce an object, such as a furnace or furnace fitting, intended to be in contact with molten aluminium which is substantially unaffected both chemically and physically by the bath of aluminium and which withstands the high temperatures whilst at the same time being of relatively low cost because it does not involve the use of special or synthetic refractory products, such as tabular alumina zirconia or synthetic alumina.

The invention relates to a solid material having a deflection temperature under load above 1000° C., a content by weight of aluminium, expressed as $Al_2O_3$, of from 10% to 60% and, better still, from 30% to 50% and a content by weight of fluorine of from 0.1% to 10% and better still from 0.2 to 5%, the fluorine forming part of the structure of the material, wherein it has a content by weight of silicon, expressed as $SiO_2$, of from 5% to 85% and, better still, from 20% to 60%.

The very small proportion of fluorine incorporated in the mass has proved to be sufficient to prevent the material from being chemically or physicochemically attacked by the aluminium, and insufficient for adversely affecting the refractory properties of the material to an unacceptable extent. The incorporation of fluorine, even in small proportions, radically modifies the phenomenon of the wetting of the refractory material by the molten aluminium. The refractory material is neither wetted nor attacked by the aluminium.

The fact that it is possible to produce a material with properties such as these is surprising in view of U.S. Pat. No. 3,261,699 not only because this publication specifically states that silica or any other additives must not be used in significant quantities, but above all because it was not foreseeable that the addition of silica, a fairly reducible material, would nevertheless be tolerated for a material intended to be in contact with molten aluminium on the condition that fluorine was added to the material. In the case of the U.S. patent, the addition of fluorine to the alumina is motivated by the composition of the electrolyte and not by the need to protect the rest of the material consisting of Bayer alumina which is a non-reducible material. By contrast, the role and function of the fluorine are entirely different in the material according to the invention. They prevent the SiO$_2$ from being attacked by the molten aluminium.

The deflection temperature under load ($T_{0.5}$) characterises the refractory quality and the mechanical strength of the refractory material. It is determined in accordance with the Standard ISO R 1893 (F) of October, 1970. The test essentially comprises placing a cylindrical test specimen 50 mm in diameter and 50 mm tall made of the material tested in a furnace between the compression rods of a compression device capable of applying a constant load of 2 kgf/cm$^2$ to the test specimen, and recording the temperature reached on deformation to 0.5% of the initial height of the test specimen for a given heating rate of the furnace of 10° C. per minute to 500° C., and then 5° C. per minute beyond 500° C.

The statement that the fluorine forms part of the structure is meant to show that the fluorine is not present in the form of a gas adsorbed in the pores of a basic aggregate or in the form of a coating applied to the surface and in the pores of that aggregate. The fluorine is present in and distributed throughout the mass in a solid form, combined with the aggregate, or in the form of a solid fluorine compound associated with the aggregate. In general, the fluorine is uniformly distributed throughout the mass. Analysis of samples taken at points situated at different distances from the surface intended to come into contact with the molten aluminium reveals the presence of fluorine. The fluorine is virtually only desorbed at temperatures above the service temperature.

The invention also relates to a solid material having a deflection temperature under load above 1000° C., a content by weight of sodium, expressed as Na$_2$O, of less than 5% and better still less than 2%, a content by weight of aluminium, zirconium, beryllium, chromium and carbon, expressed respectively as Al$_2$O$_3$, ZrO$_2$, BeO, Cr$_2$O$_3$ and SiC, of less than 60% and a content by weight of fluorine of from 0.1% to 10% and better still from 0.2% to 5%.

The invention also relates to a solid material having a deflection temperature under load above 1000° C., a content by weight of alkali metal, especially sodium expressed as Na$_2$O, of less than 5% and better still less than 2%, a content by weight of phosphorus, expressed as H$_3$PO$_4$, of less than 5% and better still less than 2% and a content by weight of fluorine of the same order as indicated above.

Other materials according to the invention have a content by weight of phosphorus expressed as H$_3$PO$_4$ of less than 5% and better still less than 2%.

Preferably, these materials which generally contain oxidised silicon, have an average content by weight of aluminium, expressed as Al$_2$O$_3$, of for example more than 10%, better still more than 30% or even better more than 40%, but less than 60%, better still less than 55% and even better less than 50%.

Apart from the fact that it is surprising that a material of the kind in question has both the required refractory quality and also the property of not being wetted by the molten aluminium for such low fluorine contents and such high silicon contents, its production has given rise to unexpected difficulties, because it has been found that the fluorine compounds and the alumina, which are known to retard the setting of conventional cements and concretes, play a different part with the refractory aggregates with which they are associated to form a material according to the invention. The presence of fluorine gives rise to a false setting phenomenon. Accordingly, special procedures have to be adopted.

According to the first of these procedures, the aggregate, the fluorine compound, a hydraulic binder and water have to be stirred for a sufficient period after they have been combined in order to avoid this false setting phenomenon. A stirring time of approximately 10 minutes is generally sufficient. It is also advisable to select a fluorine content for the final material which is as low as possible within the effective range. It is also advisable to add a setting retarder.

The first stage of this method comprises mixing an aggregate and a hydraulic binder.

Products of high alumina content, for example with an alumina content of more than 45% or even more than 55% by weight, may be used as aggregate.

Thus, it is possible to use an aggregate comprising cyanite, sillimanite, bauxite, diaspore, corundum, andalusite, gibbsite, synthetic mullite.

It is also possible to use aggregates incorporating special refractory products, such as products of magnesia, chromite, chrome-magnesia, forsterite, dolomite, carbon products based on graphite or coke, silicon carbide products, zirconia products, zirconium silicate, nitride-containing products. However, it is possible by virtue of the invention not to use the expensive products mentioned above, and to obtain satisfactory results with more common aggregates.

Aggregates such as these are in particular those with a content by weight of alumina of from approximately 35% to 45%, which are often referred to as argilaceous products, and those with a content by weight of alumina of from 10% to 35%, which are known as silico-argilaceous products, the complementary contents of the alumina being formed by silica aside from a few impurities.

The grain size distribution of the aggregate is conventional. For example, the following distribution may be adopted:

0 to 0.2 mm—5 to 25%
0.2 to 2 mm—20 to 50%
2 to 5 mm—5 to 35%
5 to 10 mm—20 to 60%

Suitable binders are the conventional hydraulic binders, especially aluminous and silico-aluminous binders. Their alumina content is with advantage equal to at least 30% by weight. It is possible to use in particular "Lafarge" alumina cement which is a calcium aluminate containing 40% of alumina, Secar 162 which contains 60% of alumina, Secar 250 which contains 70% of alumina and Supersecar which contains 80% of alumina. The calcium content, expressed as CaO, of the Secar and "Lafarge" alumina cement is 17–40% by weight.

In general, the binder makes up from 10 to 35% of the weight of the aggregate.

The aggregate and the binder are mixed for at least 1 minute and generally for 1 to 10 minutes. Thus, the material comprising the aggregate and the binder may comprise from 4 to 14% by weight of calcium, expressed as CaO.

The second phase of the method described above comprises adding to the mass of aggregate and binder from 0.1 to 10%, expressed as fluorine, of one or more fluorine compounds, followed by further mixing for a few minutes.

Suitable fluorine compounds include alkali metal and alkaline earth metal fluorides and fluosilicates.

It is of advantage to use a mixture of two fluorine compounds, one of which is more volatile or more soluble than the other in water. Thus, a system containing for example from 0.8 to 1.2% of sodium fluosilicate and from 0.2 to 0.8% of calcium fluoride gives satisfactory results.

The third stage of the process using a hydraulic binder comprises mixing the mixture of aggregate, binder and fluorine compound with a quantity of water representing from approximately 2 to 20% of the weight of this mixture.

A setting retarder is preferably added to the mixing water. The setting retarder generally represents from 0.2 to 2% of the mixture of aggregate, binder and fluorine compound.

Suitable retarders are, preferably, the "sealing retarders" which render the surface of the grains impermeable to the solubility reducers.

Water soluble or surface active sealing retarders of this type include in particular glycolic acid, glycolic aldehyde, tartronic acid, glyceric aldehyde, glycerol, pyruvic acid, glyceric aldehyde, dihydroxy acetone, maleic acid, succinic acid, malic acid, tartaric acid, erythrol, dihydroxy tartaric acid, α- and β- ketoglutaric acids, arabitol, gluconic acid, galactonic acid, sorbitol, citric acid, salicylic acid, diphenols (resoroinol, hydroquinone), benzoquinone, gallic acid, dioxane, organic materials which flocculate in the pesence of $Ca^{++}$, for example digallic acid, casein, proteins such as albumin, gum, pepsin, melamine resin, lignosulphates, $C_{12}$–$C_{18}$ fatty acids, oleic acid, naphthenic acids, benzoic acid, pentachlorophenol, dialkylene glycols, mono-and polyethanolamines, glucides, glucose, saccharose, starch, cellulose and other sugars, etc.

It is surprising that the presence of fluorine, a conventional retarder used in the hardening of concrete, necessitates the addition of another retarder to prevent false setting in the particular case of the invention, whereas above all the alumina itself is also known for its retarding effect on the setting of conventional structural mortars and concretes.

After the mixing water has been added, mixing is continued for at least 8 minutes and better still for 10 minutes.

Thereafter a material is obtained which it is sufficient to mould and harden and then to heat slowly, for example first to approximately 100° to 120° C. and then to approximately 700° C., to form the refractory material according to the invention.

In a second procedure, the binder used is a chemical binder, such as ethyl silicate, sodium silicate, phosphoric acid or a phosphate. The phenomenon of false setting no longer occurs. The quantities of chemical binder used are of the same order of magnitude as those mentioned in reference to the hydraulic binders. In this second process, mixing and cooking are carried out in the same way as before. The aggregate has a content by weight of silicon expressed as $SiO_2$, a content by weight of aluminium expressed as $Al_2O_3$ and/or a content by weight of zirconium expressed as $ZrO_2$ of from 1% to 99%.

Finally, a ceramic binder, especially clay, may be used.

The refractory material may be used in the form of a pourable material or in the form of linings or bricks for the construction of furnaces and other fittings for the molten aluminium.

The invention is illustrated by the following Examples.

EXAMPLS 1 TO 10

Two pellets with a height of 5 mm and a diameter of 15 mm of each of three alloys selected for their aggressiveness, graduated from slight to very pronounced, are placed on the refractory material to be tested. The pieces of refractory material together with their pellets are then placed in an electric muffle furnace for 48 hours at a temperature of 800° C. This temperature of 800° C. is the average temperature used in aluminium smelting or holding furnaces, and the residence time selected is sufficient to provide for adequate sensitivity to the test.

The value of the reaction is determined by an index which is the sum of three reaction indices of each of the alloys, being defined as follows:

0: no visible reaction or mark on the refractory material.

1: slight mark on the refractory material, but volume of the pellet maintained, the pellet being readily detached by hand.

2: pellet detached from the refractory material, its volume having decreased by less than 50% or the "ring" if any not exceeding 22 mm in its largest dimension or the beginning of "mushrooming" on the refractory material.

3: pellet detached from the refractory material, its volume having decreased by more than 50% or the ring formed having a diameter of 22 mm in its largest dimension or significant "mushrooming" on the refractory material.

The tests (2 pellets of three alloys) are carried out twice in each case.

Since the results are characterised by a certain dispersion (it is generally accepted that the reaction only takes place after an initiation period of arbitrary duration), the maximum index obtained is awarded to each alloy.

The alloys have the following composition:
slightly aggressive alloy A: Zn 0%
aggressive alloy B: 0.22%
highly aggressive alloy C: Zn 2%
For the three alloys, the other elements added to the aluminium are as follows:
iron 0.33%—silicon 8.7%—copper 3.1%—magnesium 0.22%

Table I below shows the type of fluorine compound used in the second column, the content of the fluorine compound in the third column and the index obtained in the fourth column. The test marked with an asterisk is a comparison test carried out on a fluorine-free refractory material. The aggregate is a mixture of chamotte and the binder, which represents 30% of its weight, is a calcium aluminate containing 40% of $Al_2O_3$.

Table I

| Example No. | Fluorine Compound | Content % | Reaction Index |
|---|---|---|---|
| 1 | Na F | 1 | 0 |

Table I-continued

| Example No. | Fluorine Compound | Content % | Reaction Index |
|---|---|---|---|
| 1* | — | — | 9 |
| 2 | $(NH_4)_2 SiF_6$ | 1 | 0 |
| 3 | $Na_2 Si F_6$ | 0.1 | 8 |
| 4 | $Na_2 Si F_6$ | 0.3 | 6 |
| 5 | $Na_2 Si F_6$ | 1 | 0 |
| 6 | $Na_2 Si F_6$ | 1.5 | 0 |
| 7 | $Ca Si F_6$ | 1 | 0 |
| 8 | $Ca Si F_6$ | 2 | 0 |
| 9 | $Ca F_2$ | 1 | 0 |
| 10 | $Ca F_2$ + $Na Si F_6$ | 0.5 | |

EXAMPLE 11

30 kg of chamotte with a grain size of from 2 to 4 mm, 22.5 kg of chamotte with a grain size of less than 0.1 mm and 22.5 kg of Secar are mixed for 2 minutes in a concrete mixer.

0.5 kg of $CaF_2$ and 1 kg of $Na_2SiF_6$ are then added, followed by mixing for another 2 minutes.

A solution of a retarding agent is prepared by adding 1 kg of retardant to 10 liters of water.

This solution is poured into the concrete mixer, followed by mixing for 9 minutes.

The mass is discharged from the concrete mixer and poured between a male mould and a female mould separated from one another by an interval of 40 mm.

The mass is left to harden and set for 24 hours without drying. To this end, it is covered with damp sacks.

The female mould is withdrawn, followed by drying in air for 48 hours.

The ladle of the material according to the invention is gently heated for 24 hours at 115° C. in the absence of any contact with a flame.

The ladle is then gradually heated to a temperature of 700° C. by increasing the temperature at a rate of 30° C. per hour. It is kept at 700° C. for a period of 6 hours.

A test ladle of this type withstands the repeated attack of molten aluminium for more than 4 months.

EXAMPLE 12

The procedure is as in Example 11 except for the modifications indicated in Table II.

EXAMPLES 13 TO 15

The procedure is as in Example 11 except for the modifications indicated in Table II. The material is applied to the mould by tamping in the form of a rammed clay.

Table II

| Example No. | Granulate | Binder | Fluorides | Water | Analysis % $Al_2O_3$ | $Na_2O + K_2O$ | F | Resistance Pyro-scopic | Deflection under load |
|---|---|---|---|---|---|---|---|---|---|
| 12 | tabular alumina 1.25 mm 10 kg | aluminous cement containing 70% of $Al_2O_3$ 3.5 kg | 50 g of $CaF_2$ 100 g of Na-fluo-silicate | 1.5 l | 92 | 0.4 | 0.7 | 1900 | 1700 |
| 13 | chamotte 40/42 0–0.2 mm 3 kg 0.2–2 mm 3 kg 2–4 mm 4 kg | aluminous cement containing 40% of $Al_2O_3$ 3 kg | 50 g of $CaF_2$ 100 g of Na-fluo-silicate | 2 l | 40 | 1 | 0.7 | 1710 | 1400 |
| 14 | chamotte 40/42 0–0.2 mm 3 kg 0.2–2 mm 3 kg 2–4 mm 4 kg | clay 40/42 1.5 kg Na-silicate | 50 g of $CaF_2$ 100 g of Na-fluo-silicate | 0.8 l | 40 | 1.1 | 0.7 | 1605 | 1350 |
| 15 | chamotte 40/42 0–0.2 mm 3 kg 0.2–2 mm 3 kg 2–4 mm 4 kg | clay 40/42 1.5 kg 50% Al-monophos-phate solution 0.9 kg | 50 g of $CaF_2$ 100 g of Na-fluo-silicate | none | 40 | 0.6 | 0.7 | 1655 | 1400 |

The invention concerns a non-fibrous castable refractory concrete, having a deflection temperature under load above 1000° C. and a compressive strength higher than 1450 Newton/cm², comprising grains bound by a hydraulic binder and having a content by weight of aluminum expressed as $Al_2O_3$ of from 40 to 60%, a content by weight of calcium expressed as CaO of from 4 to 14%, a content by weight of silicon expressed as $SiO_2$ of from 20 to 60% and a content by weight of fluorine of from 0.1 to 10%, a part of said fluorine being present as alkali or alkaline earth metal fluoride, preferably the compressive strength is higher than 2000 Newton/cm² and may reach 3800 Newton/cm². The specific gravity of the cast concrete is about 2.

Compressive strength is a drastic quality for a castable refractory concrete for making furnaces, because when the furnace is loaded, aluminum metal ingots are thrown into the furnace and because the cleaning of the furnace is made with metallic tools which scrap the impurities from the inner surface of the furnace. Furthermore, the specific gravity or compacity of the concrete is very important when treating molten aluminum with fluxes to avoid that said fluxes enter the concrete.

The invention relates also to a container containing molten aluminum and comprising a material having a deflection temperature under load above 1000° C. and a compressive strength higher than 1450 Newton/cm², said material comprising grains bound by a hydraulic binder and having a content by weight of aluminum expressed as $Al_2O_3$ of from 40 to 60%, a content by weight of calcium expressed as CaO of from 4 to 14%, a content by weight of silicon expressed as $SiO_2$ of from 20 to 60% and a content by weight of fluorine of from 0.1 to 10%.

We claim:

1. A nonfibrous castable refractory concrete nonwettable by molten aluminum, having a deflection temperature under load above 1000° C. and a compressive strength higher than 1450 Newton/cm$^2$ comprising grains bound by a hydraulic binder and having a content by weight of aluminum expressed as Al$_2$O$_3$ of from 40 to 60%, a content by weight of calcium expressed as CaO of from 4 to 14%, a content by weight of silicon expressed as SiO$_2$ of from 20 to 60%, a content by weight of sodium, expressed as Na$_2$O less than 2%, and a fluorine-containing material, consisting of F$_2$Ca in an amount between 1 and 2% by weight or consisting of a mixture 0.8–1.2% by weight of alkali or alkaline-earth metal fluosilicate and 0.2–0.8% by weight of F$_2$Ca, said fluorine-containing material being distributed uniformly throughout the mass of said concrete in a solid form.